J. W. Groat.
Carburetor.
Nº 90,445. Patented May 25, 1869.
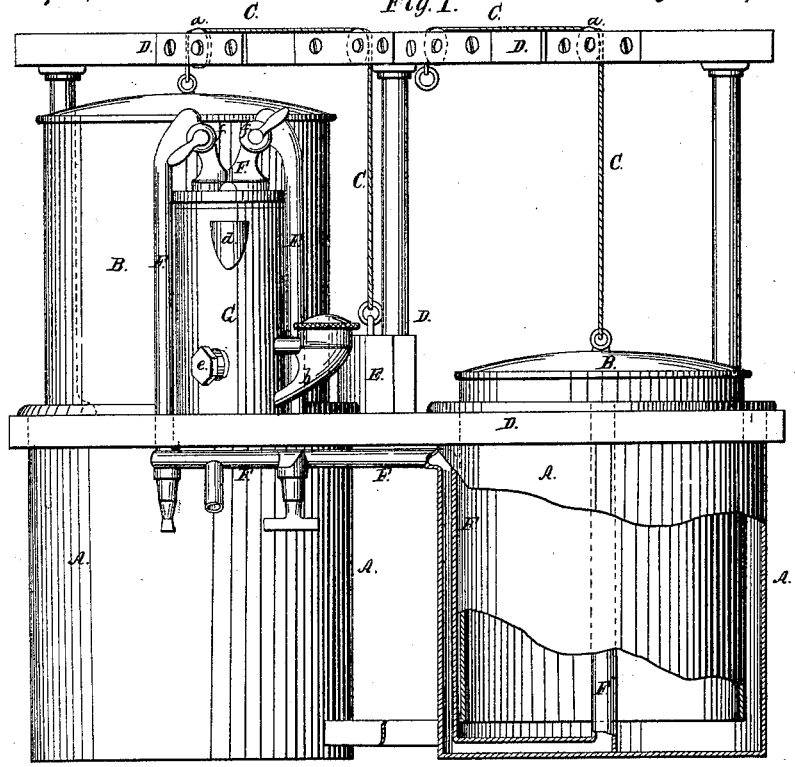
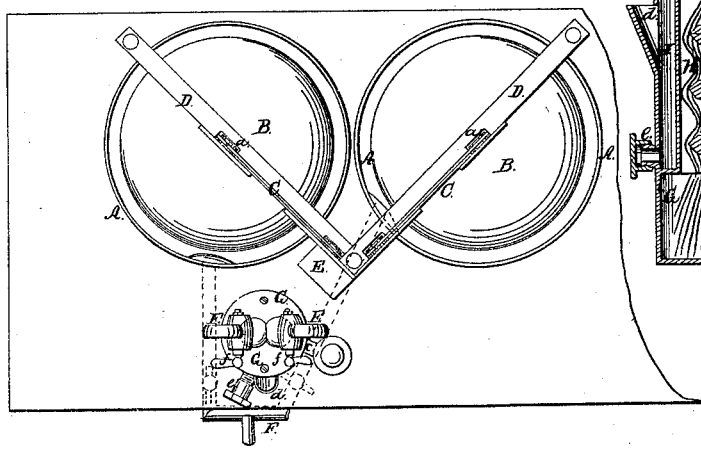
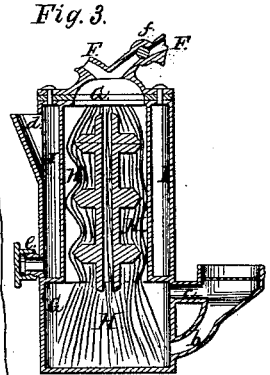
Witnesses.
Jh. Becker.
Wm A Morgan
Inventor.
J. W. Groat
por
Attorneys.

UNITED STATES PATENT OFFICE.

J. W. GROAT, OF FREMONT, OHIO.

IMPROVED GAS-MACHINE.

Specification forming part of Letters Patent No. 90,445, dated May 25, 1869.

*To all whom it may concern:*

Be it known that I, J. W. GROAT, M. D., of Fremont, in the county of Sandusky and State of Ohio, have invented a new and Improved Gas-Machine; and I do hereby declare that the following is a full, clear, and exact description thereof, which will enable others skilled in the art to make and use the same, reference being had to the accompanying drawings, forming part of this specification, in which—

Figure 1 represents a side elevation, partly in section, of my improved gas-machine. Fig. 2 is a plan or top view, on a reduced scale, of the same. Fig. 3 is a detail vertical section of my improved carbureter.

Similar letters of reference indicate corresponding parts.

This invention relates to a new self-acting gas-machine, in which the use of a pump for forcing or drawing the gas from the carbureter to the gas-holder is dispensed with, and also to a new construction of carbureter.

The invention consists, chiefly, in applying the reciprocating gas-holder to the purpose of drawing the gas into the tank by attaching a weight heavier than the gas-holder to the same, said weight elevating the holder and causing a vacuum in the tank, which is rapidly filled with gas produced in the carbureter.

The invention also consists in the construction of the carbureter, which is a vessel containing a column or columns of porous material, such as asbestus or fabric, for elevating the gasoline by capillary attraction. Air is drawn through the vessel by the aforesaid pumping process, and absorbs as much of the evaporated gasoline as is necessary to produce the desired quality of gas. The carbureter is surrounded by an annular vessel, containing hot water or other heating material for restoring the proper temperature to the inside of the carbureter, which is cooled by rapid evaporation. The gas-holder will, when the tank is filled and the weight removed, press upon the gas and force it out of the tank to the burners.

A in the drawings represent a tank for a gas-machine, made of cylindrical or other suitable form, in the usual manner. B is the gas-holder for the tank A. It fits into the upper open end of the tank, and can be elevated and lowered in the usual manner.

The joints between the tank and gas-holder may be kept tight by water or other suitable liquid, in the ordinary manner.

The gas-holder is suspended from a rope or chain, C, which passes over a roller, a, on a stationary frame, D, and which has a weight, E, attached to its end, as shown in Fig. 1. This weight is so much heavier than the gas-holder that it will raise the holder in the tank, as in Fig. 1. When, however, the weight is removed the gas-holder will, by its own weight, move down into the tank.

By means of a pipe, F, the tank A is connected with the upper part of the carbureter. This carbureter is a vessel, G, of cylindrical or other suitable form, the lower part of which is to be filled with gasoline through a pipe, b. A column, H, is arranged within the vessel G, said column being made either entirely or partly of porous material, such as asbestus, cotton, or fabric. On this porous column the gasoline will be elevated by capillary attraction, and will thereby be exposed over a large surface to facilitate evaporation. Air can enter the vessel G through a pipe, c.

When the gas-holder is elevated, as above mentioned, by means of the weight, E, it will create a vacuum in the tank, whereby air will be caused to rush through the pipe c, vessel G, and pipe F into the tank. The air, as it is thus drawn through the carbureter, causes the rapid evaporation of the gasoline, and absorbs as much of it as is necessary to produce good illuminating-gas. Thus the tank is filled and gas produced by the upward motion of the gas-holder.

The gas-holder may receive the aforesaid upward motion either by means of the weight, as specified, or by any other equivalent devices, such as screws, levers, &c.

The carbureter G is surrounded by an annular vessel, I, which is to contain hot water, steam, or other suitable heated matter, for the purpose of raising the temperature in the carbureter, which is reduced by evaporation, as aforesaid.

The water or steam enters the vessel I through a pipe or funnel, d, and passes out through another pipe, e.

The pipe F has a stop-cock or valve, $f$, which should be closed when the tank is filled, so that the gas may be forced through a branch from the pipe F to the burners without interfering again with the carbureter. The gas may, however, as well be forced through the carbureter during its passage to the burners.

There may be two tanks and gas-holders connected with one carbureter, as in Figs. 1 and 2, so that one may be making gas while the other is giving it up, to insure continuous action.

Having thus described my invention, I claim as new and desire to secure by Letters Patent—

1. Connecting the tank A of a gas-machine by means of a pipe, F, with the carbureter, so that the gas-holder, when raised, will cause air to be drawn through the carbureter into the tank, and to absorb enough gasoline during such passage through the carbureter as to be converted into illuminating-gas, substantially as herein shown and described.

2. Arranging an annular vessel, I, around the carbureter, substantially as and for the purpose herein shown and described.

3. Providing the porous column H within the carbureter G, so that the gasoline may be exposed to the action of the air that is drawn through the carbureter, substantially as herein shown and described.

4. A gas-machine consisting of the tank A, gas-holder B, pipe F, carbureter G, porous column H, or its equivalent, and weight E, or its equivalent, all made, combined, and operating substantially as herein shown and described.

J. W. GROAT, M. D.

Witnesses:
M. E. TYLER,
JOHN W. TYLER.